Patented Aug. 29, 1944

2,356,907

UNITED STATES PATENT OFFICE 2,356,907

1,3-DIARYLISOBENZOFURANS AND PROCESS FOR PREPARING THE SAME

Roger Adams, Urbana, Ill., assignor to E. I. du Pont de Nemours & Company, Wilmington, Del., a corporation of Delaware No Drawing. Application July 27, 1940, Serial No. 348,073

6 Claims. (Cl. 260—346)

This invention relates to the preparation of organic compounds and more particularly to the preparation of 1,3-diarylisobenzofuran compounds and intermediates employed in their preparation. The invention also relates to novel processes employed in the preparation of the intermediates used in the preparation of 1,3-diarylisobenzofuran.

In copending application Serial No. 348,072, now Patent 2,325,727, issued Aug. 3, 1943, there is described the preparation of new 1,3-diaryl-4,7-dihydroisobenzofuran compounds and the method for producing them from butadienes and 1,2-diaroylethylenes.

1,3-diphenylisobenzofuran has been prepared as disclosed in the prior art by reacting o-dibenzoylbenzene with zinc in acetic acid. The 1,3-diphenylisobenzofuran has also been produced by the Grignard reaction from phenylphthalide. See Boyd & Ladham, Journal of the Chemical Society, London, 1928, page 2089, and Guyot & Catel Compt. Rend. 140, page 1348.

It is an object of the present invention to provide a new and improved process for the preparation of 1,3-diarylisobenzofurans and also the o-diaroylbenzenes from which they may be produced. It is a further object of the invention to produce new 1,3-diarylisobenzofurans which are of particular value as oil fluorescent colors. A still further object of the invention is to provide lubricating oils which are colored by diarylisobenzofuran compounds and which exhibit strong and desirable fluorescence.

I have found that 1,3-diaryl-4,7-dihydroisobenzofurans as more particularly described in copending application Serial No. 348,072 may be converted to 1,3-diarylisobenzofurans of the formula

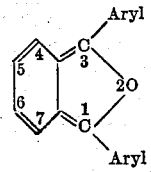

in high yields by converting the 4,7-dihydroisobenzofuran to the diaroylbenzene and then reacting it with zinc, preferably in caustic alkali solution; or by the bromination of the 1,3-diaryl-4,7-dihydroisobenzofuran followed by a dehydrohalogenation reaction. In either case, the 1,3-diaryl-4,7-dihydroisobenzofuran is brominated. Where the brominated compound is to be converted directly to the 1,3-diarylisobenzofuran one molecule of bromine is introduced into the dihydroisobenzofuran molecule. Where the dihydroisobenzofuran is to be converted first to the diaroylbenzene and then converted by means of zinc to the diarylisobenzofuran two moles of bromine are introduced into the 4,7-dihydroisobenzofuran molecule followed by elimination of two moles of hydrogen bromide and simultaneous hydrolysis to give the diaroylbenzene. The latter reaction may be illustrated as follows:

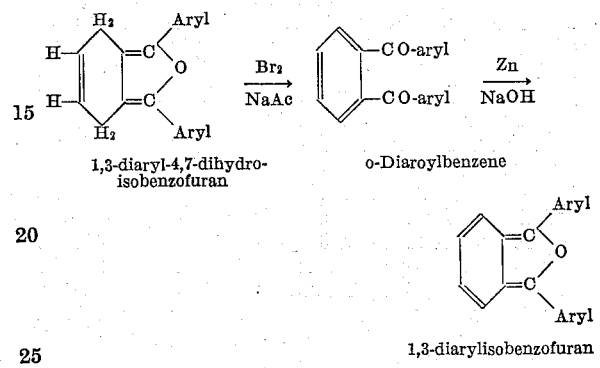

In the bromination of the 1,3-diaryl-4,7-dihydroisobenzofuran with one molecule of bromine and the dehydrohalogenation of the resulting compound to the 1,3-diarylisobenzofuran the removal of two moles of hydrogen bromide is accomplished by the action of organic amines such as pyridine.

While the conversion of the diaroylbenzenes to 1,3-diarylisobenzofuran with zinc in acetic acid is a known reaction, it has been found that the yields of the isobenzofuran obtained by this process are by no means satisfactory. I have found that materially increased and in some cases quantitative yields may be obtained by the use of zinc with alcoholic caustic alkalies.

By this new process for preparing 1,3-diarylisobenzofurans new homologues and analogues of this series may be readily produced by employing 1,3-diaryl-4,7-dihydroisobenzofurans which carry alkyl or aryl groups in the partially hydrogenated benz-ring, as well as those which carry aryl groups of higher molecular weight in the 1,3-positions. It has been found that the 1,3-diarylisobenzofurans in which the aryl groups contain at least 12 carbon atoms exhibit strong fluorescence of desirable shade when added to lubricating oils which makes these higher molecular weight derivatives of particular value. The 1,3-diarylisobenzofurans which carry aryl or alkyl groups on the benz-ring are also desirable as oil fluorescent colors particularly where the aryl groups in the 1,3-position contain over 6 carbon atoms. The following examples are given to illustrate the invention. The parts used are by weight.

Example 1

To a solution of 240 parts of acetic acid, 10 parts of sodium acetate and 5 parts of water there are added 4 parts of the 1,3-di-(p-xenyl)-4,7-dihydroisobenzofuran of Example 2 of copending application Serial No. 348,072, and the suspension is heated to boiling. 3.1 parts of bromine (2 mols) in 16 parts of acetic acid are slowly added, whereupon the furan compound is rapidly dissolved and the color of the bromine disappears. The mass is refluxed for 45 minutes and the hot solution poured into 400–500 parts of hot water and allowed to cool slowly for several hours. The mass is filtered and the crude yellow product obtained is redissolved in 44 parts of benzene. The benzene solution is treated with an absorbent carbon such as norit, then evaporated to approximately three-fifths its volume, cooled and the crystallized products separated by filtration. The o-di-(p-xenoyl)-benzene so obtained when recrystallized from a benzene-ligroin mixture has a melting point of 191–192° C. (Cor.) and is in the form of white crystals.

Example 2

To a hot solution of one part of ortho-dixenoyl-benzene (as obtained in Example 1) in 26 parts of bezene there are added one part of potassium hydroxide and 20 parts of 95% ethanol and one part of water. The mixture is then refluxed for two hours during which time the color of the solution turns to a dark brownish-yellow. One part of activated zinc dust is added and the mass is heated to reflux for 10 minutes or until the solution has turned yellow. The solution is then filtered while hot and 32 parts of acetic acid and 10 parts of water are added under agitation. The 1,3-di-(p-xenyl)-isobenzofuran is precipitated out in golden brown crystals. When cool it is removed by filtration and washed with methanol. On recrystallization from a benzene-ligroin mixture and a second recrystallization from benzene the 1,3-di-(p-xenyl)-isobenzofuran is obtained with a melting point of 247–249° C. It dissolves in lubricating oil with a strong bright bluish-green fluorescence.

Example 3

By substituting 1,3-di-(p-xenyl)-5,6-dimethyl-4,7-dihydroisobenzofuran in Example 1 for the 1,3-di-(p-x e n y l)-4,7-dihydroisobenzofuran, the 1,2-dimethyl-4,5-di-(p-xenoyl)-benzene may be obtained in the form of white crystals having a melting point of 218–219° C. (Cor.). This product on treatment with zinc in alcoholic potassium hydroxide as described in Example 2 is converted to 1,3-di-(p-x e n y l)-5,6-dimethylisobenzofuran which on recrystallization from toluene is obtained as orange crystals having a melting point of 245–247° C. (Cor.).

Example 4

Where the 1,3,5,6-tetraphenyl-4,7-dihydroisobenzofuran of copending application Serial No. 348,072 is employed the 1,2-diphenyl-4,5-dibenzoylbenzene is obtained which on crystallization from benzene has a melting point of 195–196° C. This product may be converted by the process described in Example 2 to 1,3,5,6-tetraphenylisobenzofuran which on recrystallization from toluene has a melting point of 282–284° C.

Example 5

1,3-diphenyl-5,6-dimethyl-4,7-dihydroisobenzofuran is converted in a similar manner to 1,2-dimethyl-4,5-dibenzoylbenzene having a melting point of 143–144° C. (Cor.) when recrystallized from methanol. This product may be converted by the process of Example 2 to 1,3-diphenyl-5,6-dimethylisobenzofuran having a melting point of 187–188° C. (Cor.).

Example 6

Where 1,3-diphenyl-4,7-dihydroisobenzofuran is employed in Example 1 orthodibenzoylbenzene is obtained which on recrystallization from ethanol or petroleum ether has a melting point of 145–146° C. (Cor.). This product may then be converted by the process of Example 2 to 1,3-diphenylisobenzofuran having a melting point of 125–126° C. (Cor.) when recrystallized from petroleum ether.

1,3-di-p-chlorophenyl-4,7-dihydroisobenzofuran gives 1,2-di-p-chlorobenzoylbenzene having a melting point of 167–168° C. which in turn may be converted to 1,3-di-p-chlorophenylisobenzofuran having a melting point of 199–200° C.

1,3-di-p-t o l y l-4,7-dihydroisobenzofuran gives 1,2-di-p-toluylbenzene having a melting point of 191° and this in turn may be converted to 1,3-di-p-tolylisobenzofuran having a melting point of 125° C.

1,3-di-p-chlorophenyl-5,6-dimethyl-4,7-dihydroisobenzofuran is converted to 1,2-di-p-chlorobenzoyl-4,5-dimethylbenzene having a melting point of 168–169° C. which in turn may be converted to 1,3-di-p-chlorophenyl-5,6-dimethylisobenzofuran having a melting point of 213° C.

1,3-di-p-tolyl-5,6-dimethyl-4,7-dihydroisobenzofuran is converted to 1,2-di-p-toluyl-4,5-dimethylbenzene having a melting point of 164° C. which in turn may be converted to 1,3-di-p-tolyl-5,6-dimethylisobenzofuran having a melting point of 186° C.

Example 7

To a cold solution of 2 parts of 1,3-diphenyl-4,7-dimethyl-4,7-dihydroisobenzofuran in 16 parts of glacial acetic acid there is added slowly and with cooling a solution of 1.07 parts (1 mol.) of bromine in 10 parts of acetic acid. The bromine is instantly decolorized and the bromination product begins to separate. After the product is completely precipitated it is filtered, washed with acetic acid and then with water and dried. This 1,3-diphenyl-4,7-dimethyl-5,6-d i b r o m o-4,5,6,7-tetrahydroisobenzofuran has a melting point of 165° C. and on recrystallization from N-butanol is obtained as yellow crystals having a melting point of 168–170° C. with decomposition.

Alternatively the dibromo-derivative may be obtained by direct dibromination of the 4,5-dibenzoyl-3,6-dimethylcyclohexene-1,2. The dibromide thus obtained is ring closed according to the procedure disclosed in copending application Serial No. 348,072, for the preparation of the non-bromine-containing 4,7-dihydroisobenzofurans.

Example 8

A solution of two parts of the 4,7-dimethyl-5,6-dibromotetrahydroisobenzofuran of Example 7 in ten parts of dry pyridine is refluxed for 30 minutes. The solution becomes a bright yellow color and after 10 to 15 minutes, crystals of pyridine hydrobromide separate from the solution. The solution is poured into water and the oil which separates soon crystallizes. The crude product melts at about 115–120° C. This 1,3-diphenyl - 4,7 - dimethylisobenzofuran is separated from any unchanged dibromo-compound by dissolving in ether and separating it from the undissolved dibromo-compound. On evaporation of the ether and recrystallization of the product from methanol, it is obtained as bright yellow crystals having a melting point of 129–131° C.

The alternative procedure described in Examples 7 and 8 may also be employed in the preparation of the further substituted 1,3-diarylisobenzofurans.

The 1,3-diarylisobenzofurans are particularly useful as oil fluorescent colors and exhibit relatively good light fastness when dissolved in oil.

Any of the 1,3-diaryl-4,7-dihydroisobenzofurans disclosed in copending application Ser. No. 348,072 may be converted to the 1,3-diarylisobenzofurans. The 1,3 - diaryl-4,7-dihydroisobenzofurans which carry high molecular weight aryl groups in the 1,3-position may also carry alkyl or aryl radicals in the partially hydrogenated benz-ring.

I claim:

1. 1,3-diarylisobenzofurans which carry in one of the pairs of positions 4,7- and 5,6- radicals of the group consisting of alkyl and aryl radicals.
2. 1,3-di-(p-xenyl)-5,6-dimethylisobenzofuran.
3. 1,3,5,6-tetraphenyl-isobenzofuran.
4. 1,3-diphenyl-4,7-dimethylisobenzofuran.
5. The process for preparing 1,3-diarylisobenzofurans which comprises subjecting 1,3-diaryl-4,7-dihydroisobenzofuran to the action of two moles of bromine in the presence of sodium acetate and subjecting the resulting diaroylbenzene compound to reduction with alcoholic caustic and zinc.
6. In the process for preparing 1,3-diarylisobenzofurans the step which comprises subjecting an ortho-diaroylbenzene to reduction with alcoholic caustic and zinc.

ROGER ADAMS.